(12) United States Patent
Boggio et al.

(10) Patent No.: US 11,120,051 B2
(45) Date of Patent: *Sep. 14, 2021

(54) DIMENSION OPTIMIZATION IN SINGULAR VALUE DECOMPOSITION-BASED TOPIC MODELS

(71) Applicant: THE BOEING COMPANY, Chicago, IL (US)

(72) Inventors: John M. Boggio, Columbia, IL (US); Kenneth D. Bouvier, Renton, WA (US); Stephen P. Jewett, O'Fallon, MO (US)

(73) Assignee: THE BOEING COMPANY, Chicago, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/524,983

(22) Filed: Jul. 29, 2019

(65) Prior Publication Data

US 2019/0347276 A1 Nov. 14, 2019

Related U.S. Application Data

(63) Continuation of application No. 15/474,862, filed on Mar. 30, 2017, now Pat. No. 10,409,839.

(51) Int. Cl.
*G06F 16/93* (2019.01)
*G06F 16/28* (2019.01)
*G06F 16/2458* (2019.01)
*G06F 16/36* (2019.01)

(52) U.S. Cl.
CPC ........ *G06F 16/283* (2019.01); *G06F 16/2465* (2019.01); *G06F 16/36* (2019.01); *G06F 16/93* (2019.01)

(58) Field of Classification Search
CPC .... G06F 16/283; G06F 16/93; G06F 16/2465; G06F 16/36
USPC ........................................................ 707/602
See application file for complete search history.

(56) References Cited

U.S. PATENT DOCUMENTS

| | | | |
|---|---|---|---|
| 5,625,767 A * | 4/1997 | Bartell | G06F 16/26 345/440 |
| 6,611,825 B1 * | 8/2003 | Billheimer | G06F 16/313 706/45 |
| 6,701,305 B1 * | 3/2004 | Holt | G06F 16/3347 706/45 |
| 8,290,961 B2 * | 10/2012 | Chew | G06F 16/334 707/748 |

(Continued)

*Primary Examiner* — Hanh B Thai
(74) *Attorney, Agent, or Firm* — Patterson + Sheridan, LLP

(57) ABSTRACT

Techniques are described for analyzing text. Embodiments tokenize a plurality of documents into a plurality of sets of terms. An average top dimension weight corresponding to the plurality of documents is calculated based on performing singular value decomposition (SVD) factorization for a plurality of dimension counts. An average inverse top dimension top term ranking for the plurality of documents is further calculated based on the SVD factorization for the plurality of dimension counts. A number of dimensions is determined based on the average top dimension weight and the average inverse top dimension top term ranking. A topic model is built for the plurality of documents based on the number of dimensions. The topic model is adapted to identify patterns of terms that correspond to semantic topics in at least the plurality of documents.

20 Claims, 8 Drawing Sheets

(56) References Cited

U.S. PATENT DOCUMENTS

| | | | | |
|---|---|---|---|---|
| 9,436,760 B1* | 9/2016 | Tacchi | ............... | G06N 5/022 |
| 9,710,544 B1* | 7/2017 | Smith | ............... | G06F 40/30 |
| 9,990,417 B2* | 6/2018 | Lowe | ............... | G06F 16/3325 |
| 2007/0050356 A1* | 3/2007 | Amadio | ............... | G06F 16/334 |
| 2008/0313000 A1* | 12/2008 | Degeratu | ............... | G06Q 10/06 |
| | | | | 705/319 |
| 2011/0225159 A1* | 9/2011 | Murray | ............... | G06F 16/358 |
| | | | | 707/739 |
| 2012/0072428 A1* | 3/2012 | Kao | ............... | G06Q 10/00 |
| | | | | 707/748 |
| 2016/0042053 A1* | 2/2016 | De Sousa Webber | .. | G06F 16/35 |
| | | | | 707/739 |
| 2017/0053023 A1* | 2/2017 | Holt | ............... | G06F 16/338 |
| 2017/0228435 A1* | 8/2017 | Tacchi | ............... | G06F 16/3344 |
| 2017/0228654 A1* | 8/2017 | Skupin | ............... | G06F 40/103 |
| 2017/0293676 A1* | 10/2017 | Lowe | ............... | G06F 16/93 |
| 2017/0308640 A1* | 10/2017 | Brelje | ............... | G06F 30/15 |

* cited by examiner

DIMENSION OPTIMIZATION IN SINGULAR VALUE DECOMPOSITION-BASED TOPIC MODELS

CROSS-REFERENCE TO RELATED APPLICATIONS

The present disclosure is a continuation of co-pending U.S. patent application Ser. No. 15/474,862 filed on Mar. 30, 2017 which is incorporated herein by reference in its entirety.

FIELD

Aspects described herein relate to document classification, and more specifically, to determining an optimal number of dimensions for constructing a singular value decomposition (SVD) topic model.

BACKGROUND

Text mining is an extension of the general notion of data mining in the area of free or semi-structured text. In comparison to data mining, text data analysis (also referred to as "text mining," "topic modeling," "text analytics" or simply "text analysis") refers to the analysis of text, and may involve such functions as text summarization, information visualization, document classification, document clustering, document summarization, and document cross-referencing. Thus, text data analysis may help a knowledge worker find relationships between individual unstructured or semi-structured text documents and semantic patterns across large collections of such documents.

SUMMARY

One embodiment of the present invention provides a method, system and non-transitory computer-readable medium for text analysis. The method, system and non-transitory computer-readable medium include tokenizing a plurality of documents into a plurality of sets of terms. The method, system and non-transitory computer-readable medium further include calculating an average top dimension weight corresponding to the plurality of documents based on performing singular value decomposition (SVD) factorization for a plurality of dimension counts. The method, system and non-transitory computer-readable medium further include calculating an average inverse top dimension top term ranking for the plurality of documents based on the SVD factorization for the plurality of dimension counts. The method, system and non-transitory computer-readable medium further include determining a number of dimensions based on the average top dimension weight and the average inverse top dimension top term ranking. The method, system and non-transitory computer-readable medium further include building a topic model for the plurality of documents based on the number of dimensions. The topic model is adapted to identify patterns of terms that correspond to semantic topics in at least the plurality of documents.

In one aspect, in combination with any example above, tokening the plurality of documents into the plurality of sets of terms further includes removing one or more stop words from a first one of the plurality of documents.

In one aspect, in combination with any example above, calculating the average top dimension weight further includes determining a plurality of sets of dimension weights for the plurality of documents, each set of dimension weights corresponding to a respective dimension count in the plurality of dimension counts, by performing SVD factorization to determine a plurality of dimensions for use in classifying the plurality of documents.

In one aspect, in combination with any example above, determining the number of dimensions based on the average top dimension weight and the average inverse top dimension top term ranking further includes determining the number of dimensions for which the calculated average top dimension weight is equal to the average inverse top dimension top term ranking.

In one aspect, in combination with any example above, determining the number of dimensions based on the average top dimension weight and the average inverse top dimension top term ranking further includes determining the number of dimensions for which the calculated average top dimension weight is within a predefined range of the average inverse top dimension top term ranking.

In one aspect, in combination with any example above, calculating the average top dimension weight corresponding to the plurality of documents further includes, for each of the plurality of documents, determining a top dimension of a plurality of dimensions relating to the document and determining a top dimension weight that indicates how well the top dimension describes the document. It further includes calculating the average top dimension weight by averaging the determined top dimension weights for all of the plurality of documents.

In one aspect, in combination with any example above, calculating the average inverse top dimension top term ranking for the plurality of documents further includes, for each of the plurality of documents, for each of the terms in a set of terms corresponding to the document, determining a ranking of the term within a top dimension, determining a highest ranking term for the document for the top dimension, and calculating an inverse top dimension top term ranking for the document, based on a ranking of the highest ranking term for the document within the top dimension. It further includes calculating the average inverse top dimension top term ranking by averaging inverse top dimension top term rankings for the plurality of documents.

In one aspect, in combination with any example above, each of the plurality of dimensions includes a respective plurality of terms and a respective plurality of weights. Each of the respective plurality of terms corresponds to a distinct one of the respective plurality of weights.

In one aspect, in combination with any example above, a method, system and non-transitory computer-readable medium further include performing a clustering algorithm for grouping documents within the plurality of documents into a plurality of clusters and calculating an operational impact for each of the plurality of clusters.

In one aspect, in combination with any example above, calculating the operational impact for each of the plurality of clusters is performed according to an operational impact estimation algorithm that considers a measure of delay time, a measure of repair cost, and a measure of whether a flight was cancelled, for documents assigned to the respective cluster In one aspect, in combination with any example above, a method, system and non-transitory computer-readable medium further include determining at least one of the plurality of clusters determined to have a high impact score, communicating an alert of the at least one cluster determined to have the high impact score, and facilitating one or more design changes to a subsequent aircraft design, based on the alert of the at least one cluster determined to have the high impact score, so as to reduce a likelihood of anomalous behavior from occurring in one or more aircrafts built according to the subsequent aircraft design.

In one aspect, in combination with any example above, a method, system and non-transitory computer-readable medium further include in response to determining the number of dimensions, building a topic model for the plurality of documents such as Latent Semantic Analysis (LSA) or Latent Dirichlet Allocation (LDA), tokenizing a first document into a first set of terms, tokenizing a second document into a second set of terms, and determining a similarity between a first document and a second document, using the topic model and based on the first set of terms and the second set of terms.

In one aspect, in combination with any example above, each of the plurality of dimensions includes a respective plurality of terms and a respective plurality of weights. Each of the respective plurality of terms corresponds to a distinct one of the respective plurality of weights.

BRIEF DESCRIPTION OF ILLUSTRATIONS

DETAILED DESCRIPTION

Figure 1:
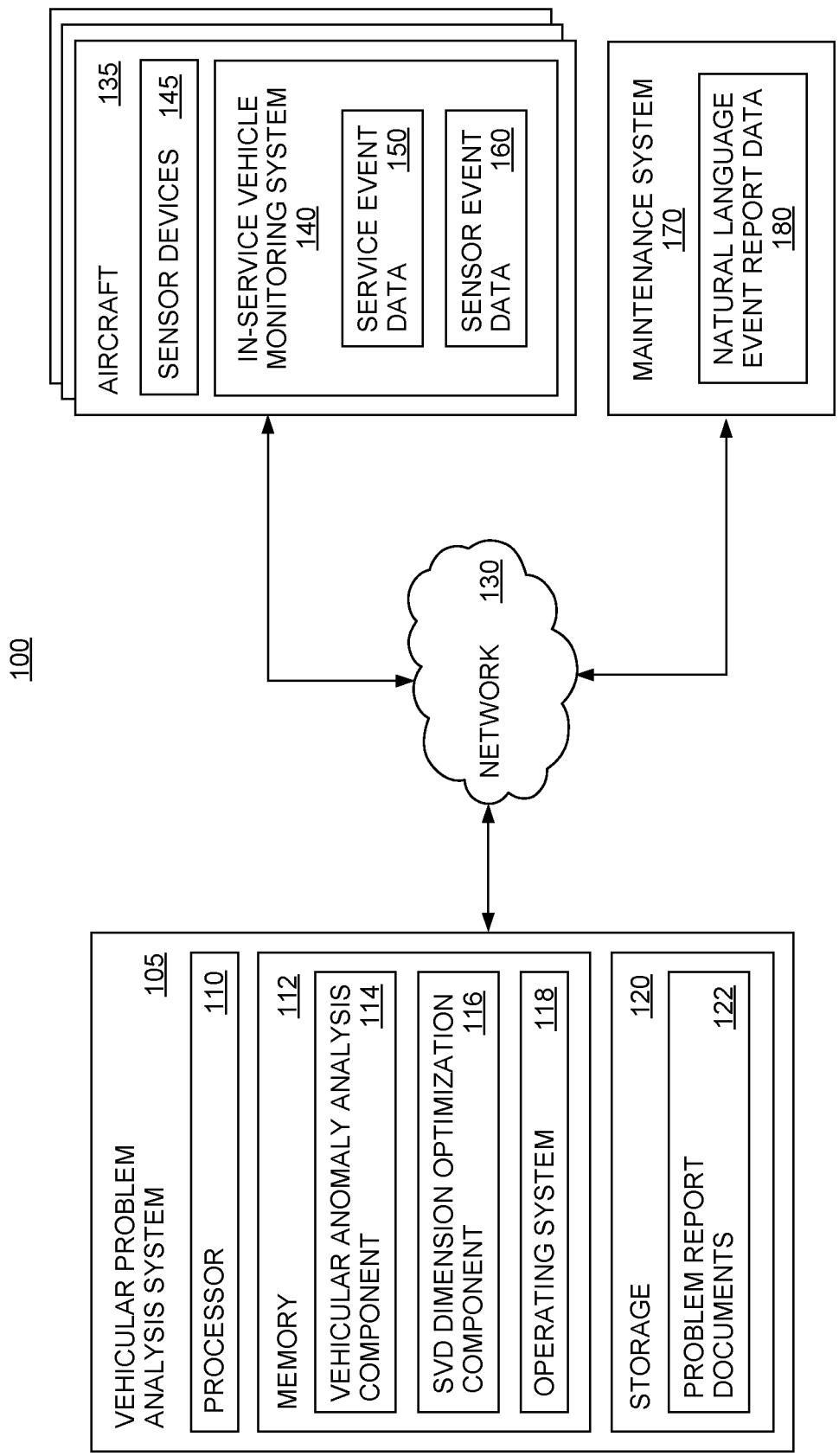
FIG. 1 is a block diagram of a system configured with a SVD dimension optimization component, according to one embodiment described herein.

For an airline, one major cost of operation is the time and labor required to keep an aircraft fleet in service. Thus, it is important for aircraft to have a design that is maintainable. Moreover, a vehicle, such as an aircraft, construction equipment, or an automobile, may periodically be taken out of service for the performance of scheduled maintenance on the apparatus. Maintenance is performed to ensure that all component parts are operating at peak efficiency and with optimal safety. Different maintenance tasks may need to be performed at different intervals than other maintenance tasks. Over time, aircraft systems have increased in complexity and development cost. Anomalous behavior identified in a system or subsystem during development may affect many other systems in complex interdependencies. This anomalous behavior can be recorded in reports, and such reports may be associated with various data, which may range from thousands of channels of digital telemetry to a few lines of unstructured free text. During ground and flight test, hundreds of reports might be generated each day, accumulating to tens of thousands over the course of a program, a number that quickly becomes unmanageable for a human performing the task of manual anomaly assessment.

Text mining and analysis techniques can be used to identify relationships between anomaly reports that may be caused by a common anomaly within a vehicle. Generally speaking, text mining enables the ability to automatically assess and characterize the similarity between two or more sources of text. Text mining typically involves the twin concepts of "document" and "term." As used in this disclosure, a "document" refers to any body of free or semi-structured text. The text can include the entire content of a document in its general sense, such as a book, an article, a paper, or the like or a portion of a traditional document, such as an abstract, a paragraph, a sentence, or a phrase, for example, a title. Ideally, a "document" describes a coherent topic. In addition, a "document" can encompass text generated from an image or other graphics, as well as text recovered from audio or video formats.

On the other hand, a document can be represented as collections of "terms," each of which can appear in multiple documents. In some cases, a "term" can consist of an individual word used in the text. However, a "term" can also include multiple words that are commonly used together, for example, "landing gear." Furthermore, the "terms" used to represent a portion of text need not explicitly appear in the text. Thus, the "terms" selected to represent a document may be obtained, for example, by applying acronym or abbreviation expansion, word stemming, spelling normalization, thesaurus-based substitutions, or many other techniques. Selecting the best set of "terms" to represent a given document generally will depend upon the particular document, or a collection to which the document belongs, as well as the specific goals of the text mining activity.

Once a suitable set of terms has been defined for a document collection, the collection can be represented as a vector space. With respect to traditional vector space methods, individual documents are treated as vectors in a high-dimensional vector space in which each dimension corresponds to some feature of a document. A collection of documents can thus be represented by a two-dimensional matrix $D_{(t,d)}$ of features and documents. In the typical case, the features correspond to document terms, and each can be assigned a weight value that represents how strongly the term correlates to the respective document. In one embodiment, the value of each term is the frequency of that term in the specified document. More complex types of vector space methods, such as latent semantic indexing (LSI), involve methods of transforming D, e.g., singular value decomposition (SVD) or semi-discrete decomposition (SDD), which typically attempt to provide a more sophisticated set of features and a better measure of the importance of each feature in a document. By representing documents as vectors in a feature space, similarities between documents can be evaluated by computing the distance between the vectors representing the documents. A cosine similarity measure is commonly used for this purpose, but other distance measures can be used. Put another way, such a topic model is generally adapted to identify patterns of terms that correspond to semantic topics across a plurality of documents.

One challenge when constructing a SVD topic model is determining how many dimensions the topic model should include. Generally, a topic model with too few dimensions will tend to find matches between documents that are fairly dissimilar, as the topic model does not have sufficient dimensions to classify each document into a sufficiently granular category (i.e., underfitting). In such a case, the topic model may perform poorly even on the set of training data, as the model does not contain sufficient dimensions to properly classify the documents in the set of training data. On the other hand, a topic model with too many dimensions will tend to not find matches between documents that are fairly similar, as the topic model classifies documents into overly granular categories (i.e., overfitting).

Thus, the number of dimensions in a topic model substantially influences the topic model's performance. However, currently setting the number of dimensions for a topic model is a manual task and typically requires conjecture and experimentation on behalf of the analyst generating the model. While the optimal number of dimensions may tend to increase with the number of documents being analyzed, this is not always the case and can depend greatly on the content of the documents themselves.

As such, embodiments generally provide techniques for optimizing a number of dimensions for performing SVD factorization. Embodiments tokenize each of a plurality of documents into a respective set of terms. For each of a plurality of dimension counts, embodiments perform the SVD factorization to determine a respective plurality of dimensions, the respective plurality of dimensions corresponding to the dimension count, determine, for each of the plurality of documents, a respective set of dimension weights for each of the plurality of dimensions, calculate an average top dimension weight across the sets of dimension weights for the plurality of documents and calculate an average inverse top dimension top term ranking across the sets of dimension weights for the plurality of documents. An optimal number of dimensions is calculated, based on the average top dimension weight and the average inverse top dimension top term ranking.

FIG. 1 is a block diagram of a system configured with a SVD dimension optimization component, according to one embodiment described herein. As shown, the system 100 includes a vehicular anomaly analysis system 105, a plurality of aircraft 135 and a maintenance system 170, interconnected by a data communications network 130. The vehicular anomaly management system 105 includes, without limitation, one or more computer processors 110, a memory 112, and storage 120, each connected to a bus (not shown). The vehicular anomaly management system 105 may also include an input/output (I/O) device interface (not shown) connecting I/O devices (e.g., keyboard, mouse, and display devices) to the vehicular anomaly management system 105. Further, in context of this disclosure, the computing elements shown in the vehicular anomaly management system 105 may correspond to a physical computing system (e.g., a system in a data center) or may be a virtual computing instance executing within a computing cloud.

Generally, the computer processor(s) 110 retrieves and executes programming instructions stored in the memory 112 as well as stores and retrieves application data residing in the memory 112. The bus is used to transmit programming instructions and application data between computer processor(s) 110, I/O devices interface, storage 120, a network interface (not shown), and memory 112. Note, computer processor(s) 110 is included to be representative of a single CPU, multiple CPUs, a single CPU having multiple processing cores, and the like. Memory 112 is generally included to be representative of a random access memory. Storage 120 may be a disk drive storage device. Although shown as a single unit, storage 120 may be a combination of fixed and/or removable storage devices, such as fixed disc drives, removable memory cards, or optical storage, network attached storage (NAS), or a storage area-network (SAN).

Illustratively, the memory 112 includes a vehicular anomaly analysis component 114, a SVD dimension optimization component 116 and an operating system 118. The storage 120 includes anomaly report documents 122. In one embodiment, the vehicular anomaly analysis component 114 communicates with sensors on an aircraft(s) during flight operations and captures the service event data 150 and sensor event data 160. Additionally, the vehicular anomaly analysis component 114 could communicate with a maintenance system to retrieve the natural language event report data 180.

Each aircraft 135 includes sensor devices 145 and an in-service vehicle monitoring system 140, which in turn includes service event data 150 and sensor event data 160. Generally, the service event data 150 represents diagnostic data (e.g., diagnostics codes and corresponding timestamps at which events classified with the diagnostic codes were detected) collected for the corresponding in-service vehicle. In one embodiment, events within the service event data 150 are automatically recorded by control logic within vehicles of the given class of vehicle.

The sensor event data 160 generally represents data collected from the sensor devices 145 on the respective in-service vehicle. Sensor devices 145 may include, without limitation, temperature sensors, pressure sensors, positioning sensors, altitude sensors, and so on. More generally, any sensor suitable for monitoring an attribute of an in-service vehicle can be used, consistent with the functionality described herein. In one embodiment, the vehicular anomaly management system 105 provides a plurality of predefined trigger conditions, each specifying conditional logic for one or more types of sensor data collected from the one or more sensor devices. In such an embodiment, upon determining that one or more sensor data values from the one or more sensor devices satisfy one of plurality of predefined trigger conditions, the vehicular anomaly management system 105 records a sensor event within the sensor event data 160.

The maintenance system 170 generally represents a computer system through which maintenance event reports can be submitted (e.g., by engineers) and includes natural language event report data 180. Generally, the natural language event report data 180 includes a natural language description of each of a plurality of service events. For example, an engineer could enter (e.g., using a graphical user interface generated by the maintenance system 170) a textual description of a particular service event, including, for example, the anomaly experienced, the cause of the anomaly, the impact(s) of the service event and the resolution of the anomaly.

Generally, the SVD dimension optimization component 116 can calculate an optimal number of dimensions for generating a topic model to analyze the anomaly report documents 122. Of note, while examples herein may be described with respect to summarizing anomaly report documents for an aircraft, such an example is provided for illustrative purposes only, and more generally, embodiments can be adapted for optimizing a number of dimensions for a topic model for classifying any type of document.

In calculating the optimal number of dimensions for a topic model, the SVD dimension optimization component 116 could tokenize each of the anomaly report documents 122 into a respective set of terms. That is, the SVD dimension optimization component 116 could generate a respective set of terms that describes each of the anomaly report documents 122. In one embodiment, the SVD dimension optimization component 116 performs a pre-processing operation which includes removing stop words from the documents. Generally, stop words refer to words that are commonly used across the plurality of documents, and may include (without limitation) words such as "the," "is," "at," "which," "a," "an," and so on. As these stop words are common across the plurality of documents, the presence (or lack thereof) of the stop words in a given document does not greatly influence the proper classification of the document. As such, the SVD dimension optimization component 116 can remove the stop words before tokenizing the document into the set of terms.

The SVD dimension optimization component 116 may then, for each of a plurality of dimension counts, perform the SVD factorization to determine values for a respective plurality of dimensions, the respective plurality of dimensions corresponding to the dimension count. For example, embodiments could be configured to analyze a number of different dimension counts, e.g., 20, 40, 60, 80, 100, and 120 dimensions. Generally, the number of dimension counts (e.g., 6, in the above example) and the range of dimension counts (e.g., from 20 to 120, in the above example) can vary across embodiments, and more generally any suitable number of dimensions and range can be used, consistent with the functionality described herein.

In performing the SVD factorization to determine a respective plurality of dimensions, the SVD dimension optimization component 116 can analyze the anomaly report documents 122 and can generate values for each of a plurality of different dimensions, the number of dimensions determined by the dimension count. For example, for each dimension, the SVD dimension optimization component 116 can generate a weight value for each of the plurality of terms appearing within the set of anomaly report documents 122. In one embodiment, the SVD dimension optimization component 116 is configured to generate a weight value between −1 and 1, where a negative value suggests that the presence of the respective term in a document indicates that the document does not correspond to the dimension (with a −1 providing the strongest indication), and where a positive value suggests that the presence of the respective term in the document indicates that the document corresponds to the dimension (with a 1 providing the strongest indication).

The SVD dimension optimization component 116 can determine, for each of the plurality of documents, a respective set of dimension weights for each of the plurality of dimensions. For example, the SVD dimension optimization component 116 could, for each dimension, compare the set of terms generated for the document with the definition for the dimension which specifies a weight value for each of the terms, to determine a dimension weight indicating how strongly the document corresponds with the dimension.

The SVD dimension optimization component 116 could then calculate an average top dimension weight across the sets of dimension weights for the plurality of documents. Generally, the top dimension weight for a particular document refers to the strength of the correlation between the document and the dimension having the best correlation to the document. The SVD dimension optimization component 116 could determine such a weight for each document and could calculate the average top dimension weight by calculating the average across all of the anomaly report documents 122.

Additionally, the SVD dimension optimization component 116 can calculate an average inverse top dimension top term ranking across the sets of dimension weights for the plurality of documents. In doing so, the SVD dimension optimization component 116 can determine, for a given document, the dimension to which the document has the strongest correlation. The SVD dimension optimization component 116 could then determine a ranking of terms within the dimension based on the weight of the terms within the definition of the dimension (i.e., based on how strongly the presence of the term within a document indicates that the document should be classified into the dimension). The SVD dimension optimization component 116 could determine the top ranked term that is contained within the given document. For example, the SVD dimension optimization component 116 could determine a ranking within the dimension for each term contained within the document, and could determine the highest rank across all of the terms. The SVD dimension optimization component 116 could invert this rank value (e.g., by dividing 1 by the rank value), and could compute the average inverse top dimension top term ranking by averaging the inverted rank values across all of the anomaly report documents 122.

The SVD dimension optimization component 116 could calculate an optimal number of dimensions, based on the average top dimension weight and the average inverse top dimension top term ranking. For example, the SVD dimension optimization component 116 could determine a number of dimensions where the average top dimension weight equals the average inverse top dimension top term ranking. In one embodiment, since there may not be a whole number of dimensions where the average top dimension weight equals the average inverse top dimension top term ranking, the SVD dimension optimization component 116 can a number of dimensions where the average top dimension weight is within a predefined range of the average inverse top dimension top term ranking (e.g., where these calculated values are within 10% of each other).

The vehicular anomaly analysis component 114 could then generate a topic model using the optimal number of dimensions and could use such a topic model to determine correlations between the anomaly report documents 122. For instance, the vehicular anomaly analysis component 114 could determine a set of anomaly report documents within the anomaly report documents 122 that are similar to one another. Such a similarity could indicate, for example, that the documents all correspond to the same aircraft anomaly or design flaw. Additionally, the vehicular anomaly analysis component 114 could determine an operational impact of the set of anomaly report documents. For example, the vehicular anomaly analysis component 120 could compute an impact score for each anomaly report document within the set and could then determine an overall average operational impact based on the individual impact scores. The vehicular anomaly analysis component 114 could identify clusters of anomaly report documents having high impact scores and could communicate a real-time alert of the high impact scored cluster. Doing so provides an indication of the most significant anomalies (e.g., anomalies determined to have the greatest operational impact on in-service vehicles), which can enable engineers to prioritize the resolution of these anomalies during the design phase of new vehicles.

Figure 2:
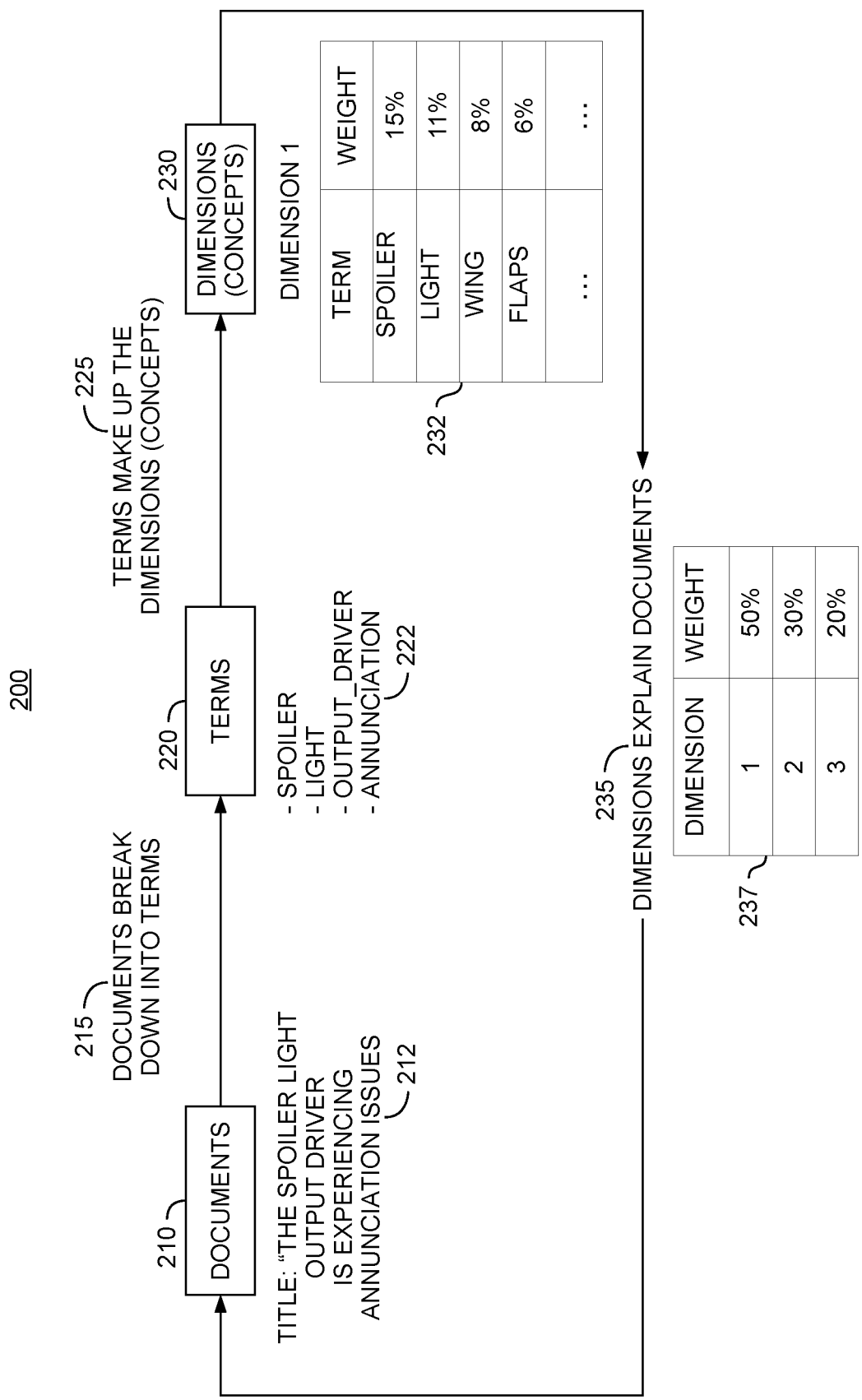
FIG. 2 is a flow diagram illustrating a workflow for classifying documents using a topic model, according to one embodiment described herein.

FIG. 2 is a flow diagram illustrating a workflow 200 for classifying documents using a topic model, according to one embodiment described herein. At operation 215, the vehicular anomaly analysis component 114 analyzes documents 210 (e.g., anomaly report documents 122) to break each document down into a respective set of terms 220. In doing so, the vehicular anomaly analysis component 114 can remove one or more stop words from the documents, so as to focus the set of terms on the terms which can best be used to represent the document. That is, since a stop word (e.g., "the") may appear in a substantial number of the documents, regardless of the subject matter of the documents, the presence (or lack thereof) of such a stop word within a given document is not particularly meaningful to the classification of the document. In the depicted example, a particularly document 212 within the documents 210 contains the text "The spoiler light output driver is experiencing annunciation anomalies" has been reduced to the set of terms "spoiler," "light," "output_driver" and "annunciation," and the stop words such as "the" and "is" have been removed.

At operation 225, the vehicular anomaly analysis component 114 can analyze the set of terms across the plurality of documents to generate dimensions (also referred to herein as "concepts"). A definition for a first dimension 232 is shown, which includes a respective weight for each of the set of terms across the plurality of documents. Of note, in this example, the definition 232 includes terms not included in the document 212, such as "wing" and "flaps." In order to determine how strongly the document 212 correlates to the particular dimension represented by definition 232, the vehicular anomaly analysis component 114 can determine the weights within the dimension definition 232 with each of the terms in the set of terms for the document 212. In one embodiment, the vehicular anomaly analysis component 114 can also consider a frequency with which the terms appear within the document. For example, while each of the terms in the set of terms 222 appears once within the document 212, other documents may include multiple references of a given term. In such an example, if a document contains multiple references of a particular term having a high weight within a dimension definition, the vehicular anomaly analysis component 114 could determine that the document has a stronger correlation to the dimension (e.g., as opposed to if the document contained fewer or no references to the particular term).

The vehicular anomaly analysis component 114 can then generate a description of the particular document 212, based on how strongly the particular document 212 correlates to each dimension (operation 235). For instance, in the depicted embodiment, the document 212 is represented using the matrix 237, where the vehicular anomaly analysis component 114 has generated a respective weight for each dimension (e.g., dimension 1 has a weight of 50%, dimension 2 a weight of 30%, and dimension 3 a weight of 20%). Such a matrix can then be used to determine similarities between the documents.

Figure 3:
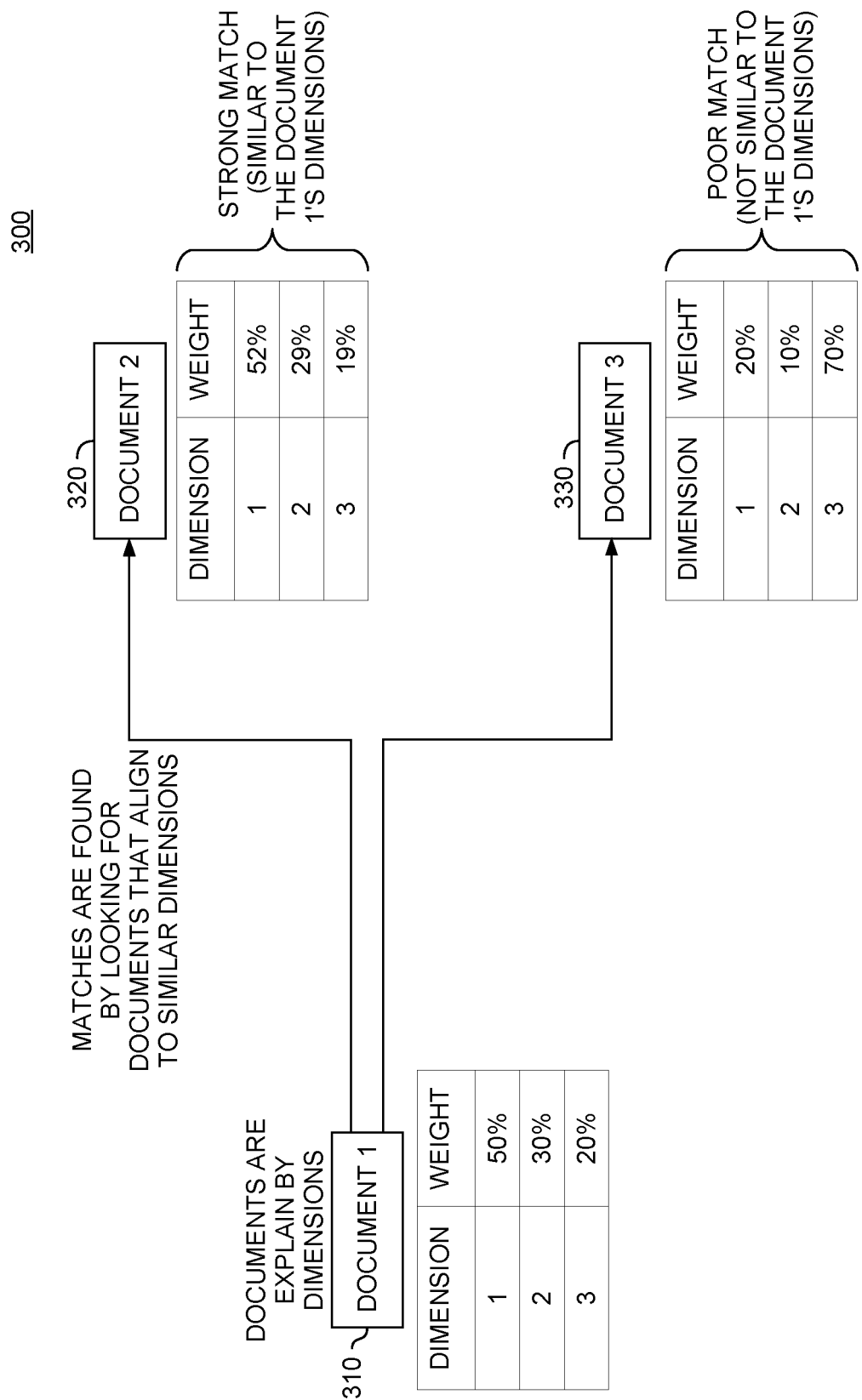
FIG. 3 is a diagram illustrating comparisons between documents, according to one embodiment described herein.

An example of this is shown in FIG. 3, which is a diagram illustrating comparisons between documents, according to one embodiment described herein. As shown, the diagram 300 includes a first matrix 310 describing a first document, a second matrix 320 describing a second document and a third matrix 330 describing a third document. The vehicular anomaly analysis component 114 could compare the first matrix 310 with each of the second and third matrices 320 and 330 to determine how similar the first document is to each of the second and third documents, respectively. As shown, the matrix 320 indicates that the vehicular anomaly analysis component 114 determined the second document has a weight of 52% for dimension 1, a weight of 29% for dimension 2 and a weight of 19% for dimension 3. Additionally, the matrix 330 shows that the vehicular anomaly analysis component 114 has determined the third document has a weight of 20% for dimension 1, a weight of 10% for dimension 2 and a weight of 70% for dimension 3.

In the depicted example, the vehicular anomaly analysis component 114 can determine that the first document is substantially similar to the second document, by determining that the matrix 310 is substantially similar to the matrix 320. That is, the vehicular anomaly analysis component 114 can compare the values for dimension 1 (i.e., "50%" with the value of "52%"), dimension 2 (i.e., "30%" with the value of "29%") and dimension 3 (i.e., "20% with the value of "19%") and can determine that the first and second documents are substantially similar because the values within the matrices 310 and 320 are substantially similar (e.g., where the values are within a predefined threshold of each other). On the other hand, the vehicular anomaly analysis component 114 could determine that the first document and the third document are poor matches, as the values within the first matrix 310 and the third matrix 330 are not similar to one another. That is, the vehicular anomaly analysis component 114 can compare the value of "50%" with the value of "20%" for dimension 1, the value of "30%" with the value of "10%" for dimension 2 and the value of "20%" with the value of "70%" for dimension 3 to determine that the first and third documents are dissimilar to one another, as the weights for each of the dimensions are dissimilar between the matrices 310 and 330. Of note, while the present example includes only three dimensions, the techniques described can be applied for any number of dimensions to determine similarities between documents.

As discussed above, for a topic model to optimally describe documents, the topic model must be generated with an optimal number of dimensions. For example, a topic model with too few dimensions may tend to underfit documents to classifications (e.g., a model with too few dimensions may not have any dimensions which accurately represent a given document, and thus all of the dimensions may be assigned a relatively equal weight), while a topic model with too many dimensions may tend to overfit documents to classifications (e.g., a model with too many dimensions may be overly granular and may fail to detect similarities between documents).

As such, the SVD dimension optimization component 116 can be configured to determine an optimal number of dimensions for a topic model for a set of documents. In doing so, the SVD dimension optimization component 116 can calculate an average top dimension weight across the sets of dimension weights for the plurality of documents. In doing so, the SVD dimension optimization component 116 can determine a respective top dimension weight for each of the plurality of documents. That is, the SVD dimension optimization component 116 can determine the weight of the dimension to which the document has the strongest correlation.

Figure 4:
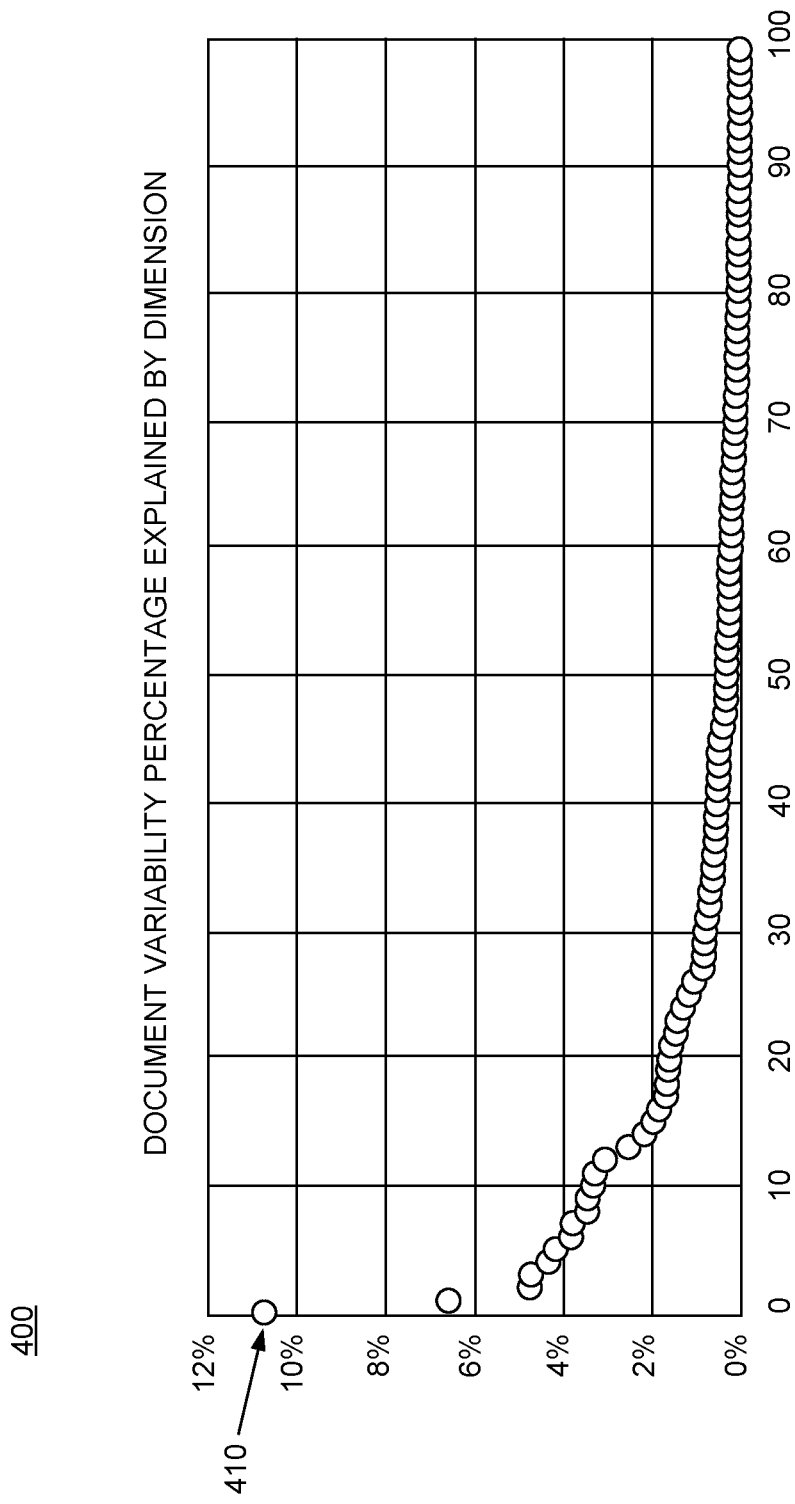
FIG. 4 is a graph illustrating a measure of document variability percentage across multiple dimensions of a topic model, according to one embodiment described herein.

An example of this is shown in FIG. 4, which is a graph illustrating a measure of document variability percentage across multiple dimensions of a topic model, according to one embodiment described herein. As shown, the graph 400 depicts the weight of each dimension (expressed as a document variability percentage explained by the dimension), for each of 100 different dimensions. In the depicted example, the SVD dimension optimization component 116 could determine that the top dimension weight for the document is represented by point 410, where a particular dimension has a weight of 11%. The SVD dimension optimization component 116 could calculate the top dimension weight for each of the plurality of documents, and the SVD dimension optimization component 116 can average these values to determine the average top dimension weight for the plurality of documents. Generally, the average top dimension weight will tend to be higher where there are fewer dimensions, and will tend to be lower as additional dimensions are added.

Figure 5:
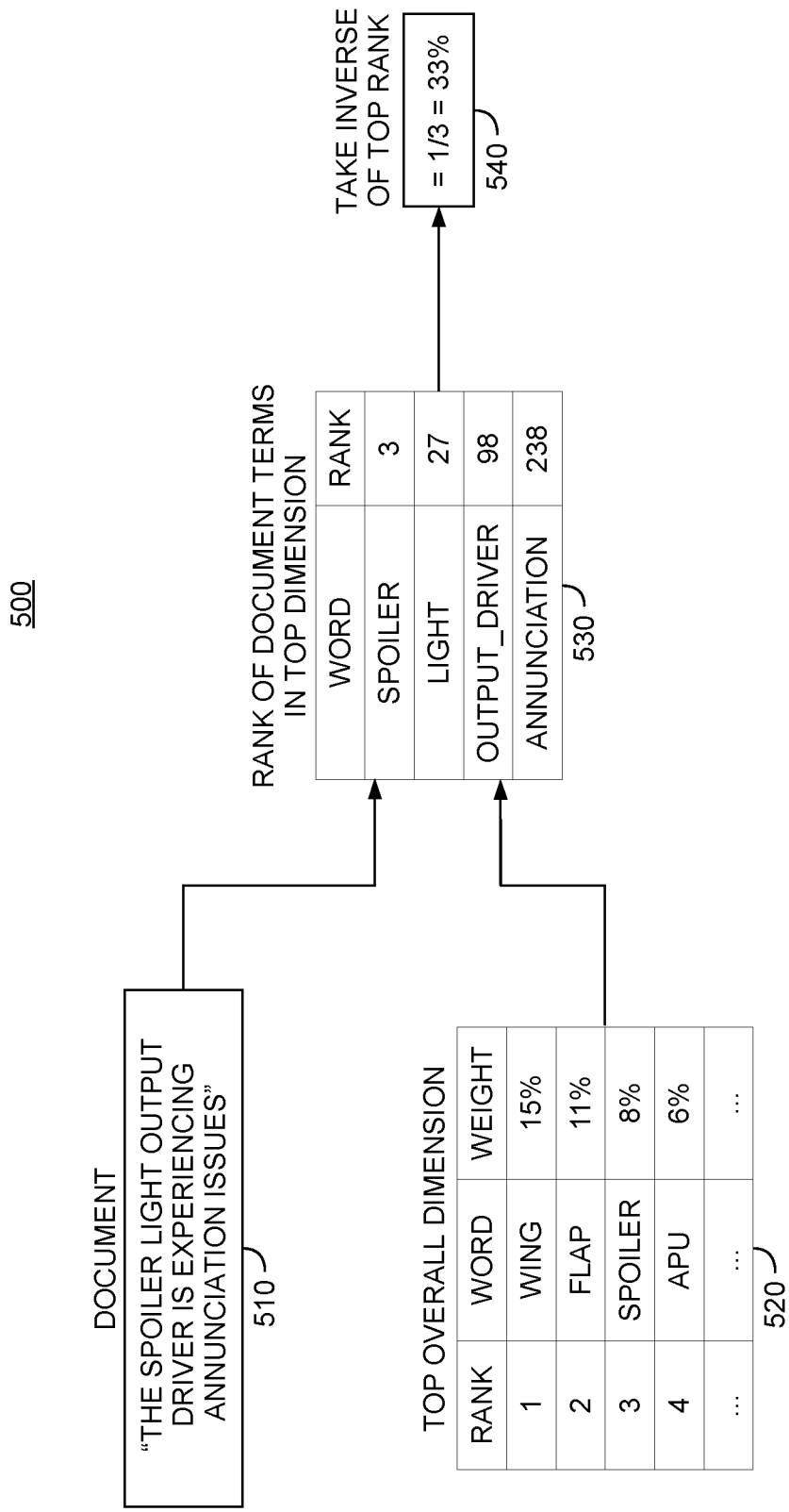
FIG. 5 is a diagram illustrating a workflow for calculating an inverse top dimension top term rank metric, according to one embodiment described herein.

Additionally, the SVD dimension optimization component 116 can calculate an average inverse top dimension top term ranking across the sets of dimension weights for the plurality of documents. FIG. 5 is a diagram illustrating a workflow for calculating an inverse top dimension top term rank metric, according to one embodiment described herein. As shown, the workflow 500 depicts a document 510 and the top overall dimension 520 having the strongest correlation to the document 510. The SVD dimension optimization component 116 can determine a ranking for each of the set of terms for the document 510, within the top overall dimension 520, as shown in the matrix 530. That is, the SVD dimension optimization component 116 can determine a ranking of each term in the definition of the dimension by sorting the terms in descending order by their respective weights. In the present example, the SVD dimension optimization component 116 has determined that the term "spoiler" has the third highest weight in the definition for the dimension 520, the term "light" has the $27^{th}$ highest weight in the definition for the dimension 520, the term "output_driver" has the $98^{th}$ highest weight in the definition for the dimension 520, and the term "annunciation" has the $238^{th}$ highest weight in the definition for the dimension 520. Of these terms, the SVD dimension optimization component 116 determines that the top term rank for the top dimension is "3," as the term appearing within the document 510 having the greatest weight within the top overall dimension 520 is "spoiler," which has the third highest rank within the dimension 520. The SVD dimension optimization component 116 can calculate the inverse of this ranking to produce the inverse top dimension top rank value 540 of 33%. The SVD dimension optimization component 116 can calculate the inverse top dimension top term rank metric for each of the plurality of documents, and can compute the average of these values to calculate the average inverse top dimension top term rank metric for the plurality of documents.

Figure 6:
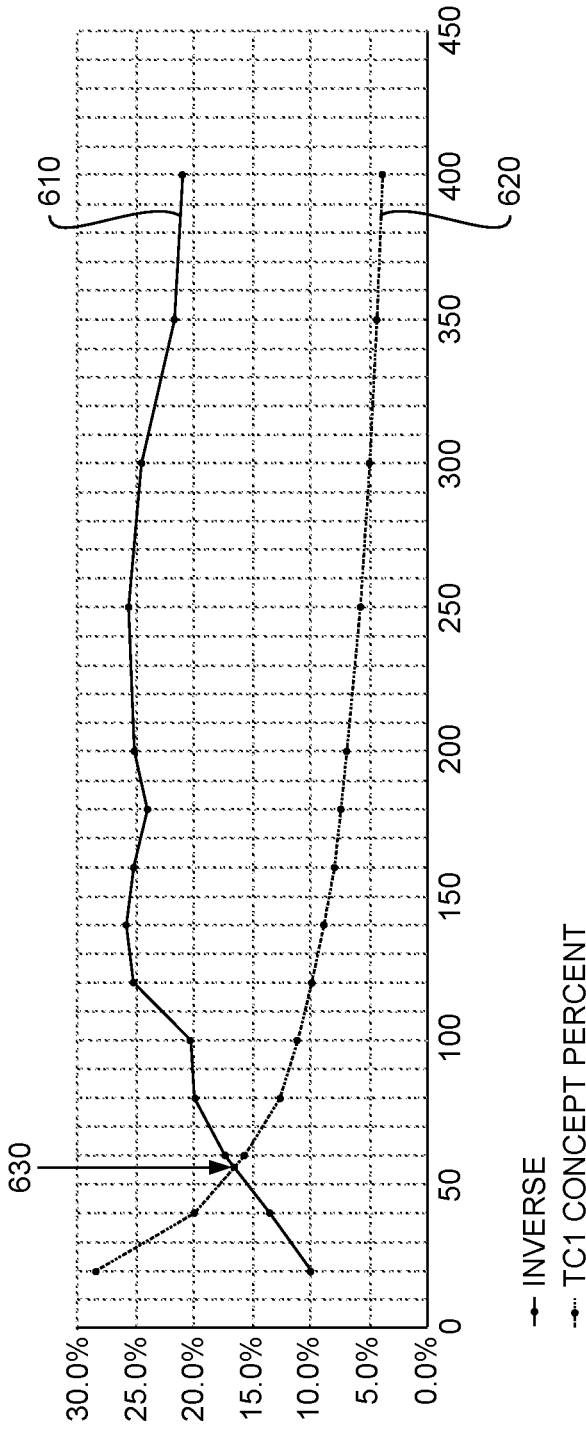
FIG. 6 is a graph illustrating values for a top dimension weight metric and an inverse top dimension top term rank metric across different numbers of dimensions, according to one embodiment described herein.

The SVD dimension optimization component 116 can calculate the average top dimension weight and the average inverse top dimension top term ranking, across a number of different dimension counts (i.e., topic models with different numbers of dimensions). The SVD dimension optimization component 116 can then determine the optimal number of dimensions, based on the calculated average top dimension weight and the average inverse top dimension top term ranking values. For example, the SVD dimension optimization component 116 could determine a number of dimensions for which the calculated average top dimension weight and the average inverse top dimension top term ranking values are equal (or substantially equal) to one another. An example of this is shown in FIG. 6, which is a graph illustrating values for a top dimension weight metric and an inverse top dimension top term rank metric across different numbers of dimensions, according to one embodiment described herein. As shown, the graph 600 depicts a graphed line of average top dimension weight values 620 and a graphed line of the average inverse top dimension top term ranking 610. In the depicted example, the SVD dimension optimization component 116 has calculated the average top dimension weight and the average inverse top dimension top term ranking values at each of a number of different dimension counts (i.e., 20, 40, 60, 80, 100, 120, 140, 160, 180, 200, 250, 300, 350, and 400 dimensions, in the present example). More generally, any dimension counts and any number of different dimension counts can be considered, consistent with the functionality described herein.

The point 630 within the graph 600 indicates the intersection between the graphed lines 610 and 620. Thus, in the present example, the SVD dimension optimization component 116 could determine that 56 dimensions is the optimal number of dimensions for the particular set of documents, based on the x-axis value of the point 630. In one embodiment, the SVD dimension optimization component 116 can be configured to round the number of intersections corresponding to the point 630 to the nearest whole number of dimensions. In a particular embodiment, the SVD dimension optimization component 116 is configured to determine a number of dimensions where the average top dimension weight and the average inverse top dimension top term ranking values are within a predefined range of one another (e.g., within 10% of one another).

Upon the SVD dimension optimization component 116 determining the optimal number of dimensions, an optimal topic model can be generated for the set of documents using the optimal number of dimensions. For example, the vehicular anomaly analysis component 114 could generate a topic model for the anomaly report documents 122, using the calculated optimal number of dimensions (i.e., 56 dimensions in the above example). The topic model can then be used to determine similarities between the anomaly report documents 122.

Figure 7:
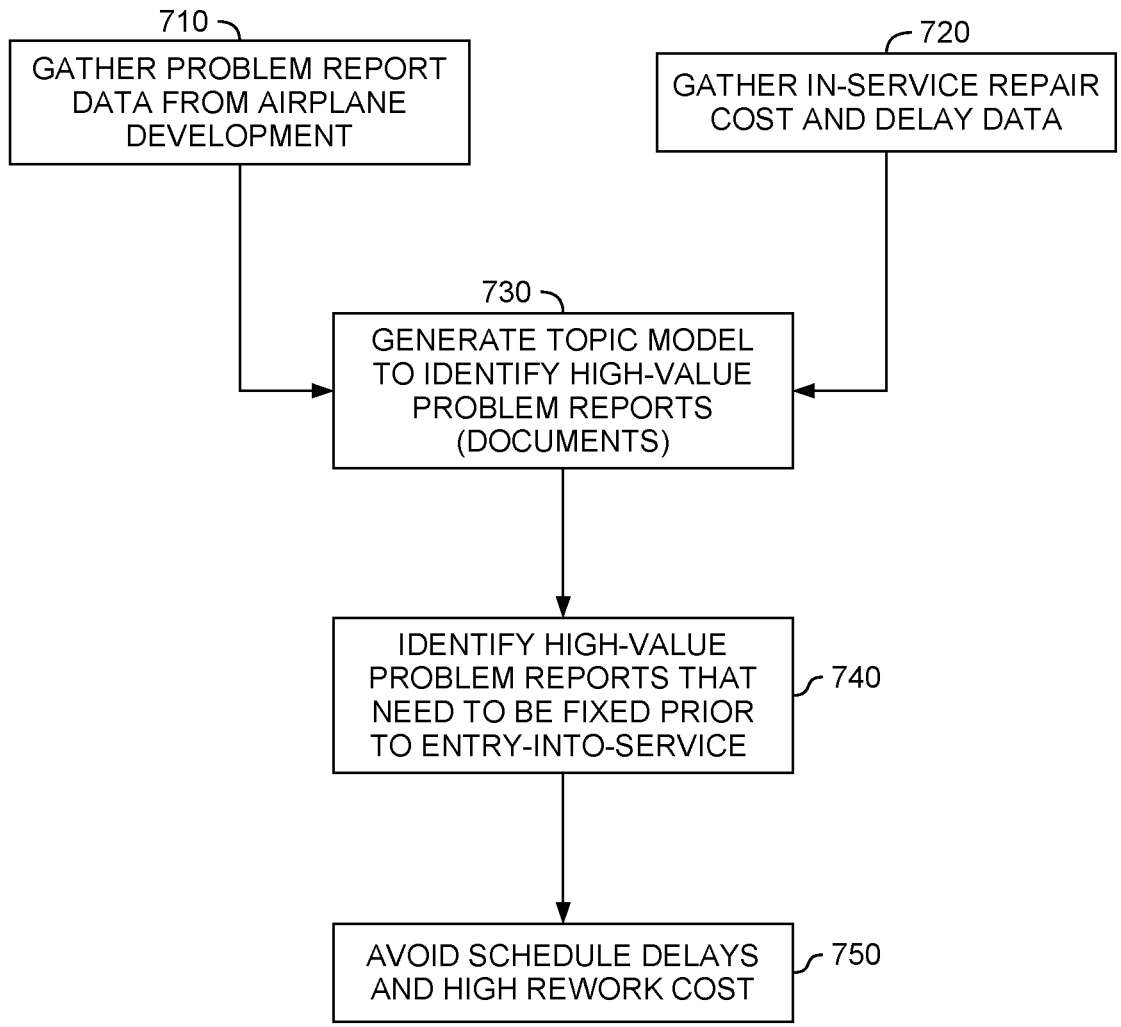
FIG. 7 is a diagram illustrating a workflow for identifying maintenance anomalies and design defects to be fixed in a vehicle, according to one embodiment described herein.

FIG. 7 illustrates a diagram depicting a workflow for identifying maintenance anomalies and design defects to be fixed in a vehicle, according to one embodiment described herein. As shown, the diagram 700 shows an operation 710 where anomaly report data is gathered from airplane development sources and an operation 720 where in-service repair cost and delay data is gathered from in-service airplanes. The vehicular anomaly analysis component 114 can then generate a topic model using the determined optimal number of dimensions, for use in determining high-value anomaly reports (operation 730). In one embodiment, the vehicular anomaly analysis component 114 could determine clusters of similar anomaly reports. Generally, any suitable clustering algorithm can be used to determine the clusters of anomaly reports, e.g., k-means clustering algorithms. The vehicular anomaly analysis component 114 can estimate an impact cost for each anomaly report (or each cluster of anomaly reports), using the in-service repair cost and delay data. In doing so, the vehicular anomaly analysis component 114 can consider the in-service repair cost and flight delay cost resulting from anomalies that are determined to be similar to each specific anomaly report (or clusters of anomaly reports).

At operation 740, the vehicular anomaly analysis component 114 identifies high-value anomaly reports (or clusters of anomaly reports). For instance, the vehicular anomaly analysis component 114 could be configured to determine when an anomaly report (or a cluster of anomaly reports) have an estimated impact cost above a predefined threshold amount of cost. At operation 750, the vehicular anomaly analysis component 114 provides an indication of the anomaly report(s) having the sufficiently high cost. For example, the vehicular anomaly analysis component 114 could generate a notification (e.g., to a design engineer), identifying the anomaly report(s) having the sufficiently high estimated impact cost. This can enable the design engineers to detect design anomalies that are likely to result in significant schedule delays and costs, where similar design anomalies to exist in in-service aircraft. The design engineers can then prioritize the design anomalies to address first, thereby avoiding scheduling delays and high rework costs for in-service aircraft.

For example, the design engineers could determine the cluster of anomaly reports having the highest estimated impact cost and could determine the attributes of the anomaly reports that led to the reports being clustered together (e.g., the indication provided by the vehicular anomaly analysis component 114 could specify one or more common parts or subsystems that the anomaly reports relate to). The design engineers could then analyze the specific reports within the cluster and could modify the design of subsequent aircrafts, in order to avoid or reduce the likelihood of the anomalous behavior from occurring. Doing so enables the design engineers to reduce the entire set of anomaly reports to a specific set of high cost anomaly reports, thereby allowing the engineers to prioritize remedies to high cost anomalies in creating design changes for the aircraft. Similarly, the technique could allow a design engineer to prioritize based on priorities other than cost, e.g., flight delays. More generally, the techniques described herein can be used for analyzing any sort of documents, including (but not limited to) anomaly reports for any sort of vehicle, such as automobiles, construction equipment, and so on.

In addition to prioritizing design changes, techniques described herein can be used to improve maintenance operations and maintenance scheduling. For instance, an engineer could analyze a report generated by the vehicular anomaly analysis component 114 and could determine that a particular design of vehicle has demonstrated a pattern of anomalous behavior over time that can be addressed with maintenance of the vehicle. For example, such anomalous behavior could be addressed by modifying an existing maintenance routine for the vehicle (e.g., to include one or more additional maintenance operations in the existing maintenance routine), adjusting the maintenance schedule for the vehicle (e.g., scheduling additional maintenance activity for the vehicle, changing how frequently maintenance is scheduled for the vehicle, etc.), and so on. Doing so can help improve the operational reliability of the vehicle overall and can help refine the maintenance processes for the vehicle.

Figure 8:
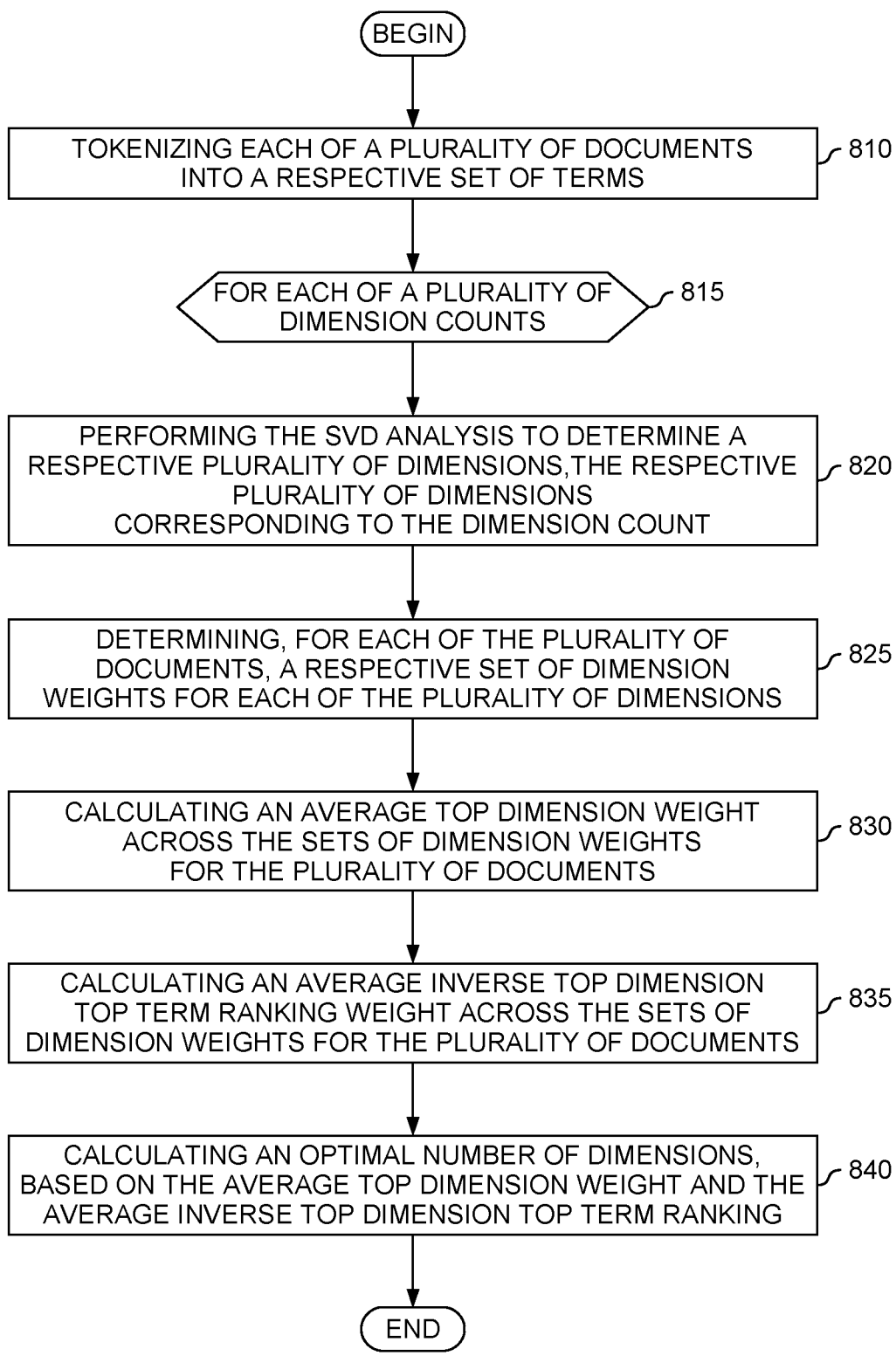
FIG. 8 is a flow diagram illustrating a method of optimizing a number of dimensions for a topic model, according to one embodiment described herein.

FIG. 8 is a flow diagram illustrating a method of optimizing a number of dimensions for a topic model, according to one embodiment described herein. As shown, the method 800 begins at block 810, where the SVD dimension optimization component 116 tokenizes each of a plurality of documents into a respective set of terms. The method 800 then enters a loop at block 815, where for each of a plurality of dimension counts, the SVD dimension optimization component 116 performs the operations 820, 825, 830 and 835. In one embodiment, the plurality of dimension counts include the values 20, 40, 60, 80, 100, 120, 140, 160, 180, 200, 250, 300, 350 and 400. At block 820, the SVD dimension optimization component 116 performs a SVD factorization on the plurality of documents to determine values for a respective plurality of dimensions (block 820). The number of dimensions within the respective plurality of dimensions corresponds to the dimension count (e.g., the SVD dimension optimization component 116 could generate a topic model with 20 dimensions, where the dimension count is 20).

The SVD dimension optimization component 116 determines, for each of the plurality of documents, a respective set of dimension weights for each of the plurality of dimensions (block 825). For example, in the diagram 200 discussed above, the SVD dimension optimization component 116 determines that the document 212 has a weight of 50% for dimension 1, a weight of 30% for dimension 2 and a weight of 20% for dimension 3, as shown in the matrix 237.

The SVD dimension optimization component 116 then calculates an average top dimension weight across the sets of dimension weights for the plurality of documents (block 830). Continuing the above example, the SVD dimension optimization component 116 could determine that the top dimension weight for the document 212 is 50%, as the document 212 has the strongest correlation with the dimension 1 and the weight for dimension 1 for document 212 is 50%. The SVD dimension optimization component 116 could determine such a metric for all of the documents in the plurality of documents and could calculate the average of these metrics to determine the average top dimension weight across the documents.

The SVD dimension optimization component 116 calculates an average inverse top dimension top term ranking across all of the plurality of documents (block 835). For example, the SVD dimension optimization component 116 could calculate an inverse top dimension top term ranking as shown in FIG. 5 and as discussed above, and could then calculate the average inverse top dimension top term ranking by averaging the calculated values for each of the plurality of documents.

The SVD dimension optimization component 116 then determines an optimal number of dimensions for generating a topic model for the plurality of documents, based on the average top dimension weight and the average inverse top dimension top term ranking (block 840), and the method 800 ends. For example, the SVD dimension optimization component 116 could determine a number of dimensions for which the average top dimension weight and the average inverse top dimension top term ranking are equal. As another example, the SVD dimension optimization component 116 could determine a number of dimensions where the average top dimension weight and the average inverse top dimension top term ranking are within a predefined amount of each other (e.g., within 10% of one another). The optimal number of dimensions can then be used, for example, to calculate an optimal SVD topic model for the plurality of documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the SVD dimension optimization component 116 or related data available in the cloud. For example, the SVD dimension optimization component 116 could execute on a computing system in the cloud and could determine an optimal number of dimensions for generating a SVD topic model. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of text analysis, comprising:
   tokenizing a plurality of documents into a plurality of sets of terms;
   calculating an average top dimension weight corresponding to the plurality of documents based on performing singular value decomposition (SVD) factorization for a plurality of dimension counts;
   calculating an average inverse top dimension top term ranking for the plurality of documents based on the SVD factorization for the plurality of dimension counts;
   determining a number of dimensions based on the average top dimension weight and the average inverse top dimension top term ranking; and
   building a topic model for the plurality of documents based on the number of dimensions, wherein the topic model is adapted to identify patterns of terms that correspond to semantic topics in at least the plurality of documents.

2. The method of claim 1, wherein tokening the plurality of documents into the plurality of sets of terms further comprises removing one or more stop words from a first one of the plurality of documents.

3. The method of claim 1, wherein calculating the average top dimension weight further comprises:
  determining a plurality of sets of dimension weights for the plurality of documents, each set of dimension weights corresponding to a respective dimension count in the plurality of dimension counts, by performing SVD factorization to determine a plurality of dimensions for use in classifying the plurality of documents.

4. The method of claim 1, wherein determining the number of dimensions based on the average top dimension weight and the average inverse top dimension top term ranking further comprises:
  determining the number of dimensions for which the calculated average top dimension weight is equal to the average inverse top dimension top term ranking.

5. The method of claim 1, wherein determining the number of dimensions based on the average top dimension weight and the average inverse top dimension top term ranking further comprises:
  determining the number of dimensions for which the calculated average top dimension weight is within a predefined range of the average inverse top dimension top term ranking.

6. The method of claim 1, wherein calculating the average top dimension weight corresponding to the plurality of documents further comprises:
  for each of the plurality of documents:
    determining a top dimension of a plurality of dimensions relating to the document; and
    determining a top dimension weight that indicates how well the top dimension describes the document; and
  calculating the average top dimension weight by averaging the determined top dimension weights for all of the plurality of documents.

7. The method of claim 6, wherein calculating the average inverse top dimension top term ranking for the plurality of documents further comprises:
  for each of the plurality of documents:
    for each of the terms in a set of terms corresponding to the document, determining a ranking of the term within a top dimension;
    determining a highest ranking term for the document for the top dimension; and
    calculating an inverse top dimension top term ranking for the document, based on a ranking of the highest ranking term for the document within the top dimension; and
  calculating the average inverse top dimension top term ranking by averaging inverse top dimension top term rankings for the plurality of documents.

8. The method of claim 1, wherein each of the plurality of dimensions comprises a respective plurality of terms and a respective plurality of weights, wherein each of the respective plurality of terms corresponds to a distinct one of the respective plurality of weights.

9. The method of claim 1, further comprising:
  performing a clustering algorithm for grouping documents within the plurality of documents into a plurality of clusters; and
  calculating an operational impact for each of the plurality of clusters.

10. The method of claim 9, wherein calculating the operational impact for each of the plurality of clusters is performed according to an operational impact estimation algorithm that considers a measure of delay time, a measure of repair cost, and a measure of whether a flight was cancelled, for documents assigned to the respective cluster.

11. The method of claim 10, further comprising:
  identifying at least one of the plurality of clusters determined to have a high impact score;
  communicating an alert of the at least one cluster determined to have the high impact score; and
  facilitating one or more design changes to a subsequent aircraft design, based on the alert of the at least one cluster determined to have the high impact score, so as to reduce a likelihood of anomalous behavior from occurring in one or more aircrafts built according to the subsequent aircraft design.

12. The method of claim 1, further comprising:
  in response to determining the number of dimensions, building a topic model for the plurality of documents such as Latent Semantic Analysis (LSA) or Latent Dirichlet Allocation (LDA);
  tokenizing a first document into a first set of terms;
  tokenizing a second document into a second set of terms; and
  determining a similarity between a first document and a second document, using the topic model and based on the first set of terms and the second set of terms.

13. The method of claim 12, wherein each of the plurality of dimensions comprises a respective plurality of terms and a respective plurality of weights, wherein each of the respective plurality of terms corresponds to a distinct one of the respective plurality of weights.

14. The method of claim 13, wherein determining the similarity between the first document and the second document further comprises:
  determining, for each of a plurality of dimensions within the topic model, a respective weight indicating a correlation between the first set of terms and the dimension;
  determining, for each of a plurality of dimensions within the topic model, a respective weight indicating a correlation between the second set of terms and the dimension; and
  comparing the weights for the first set of terms with the weights for the second set of terms, to determine the similarity between the first document and the second document.

15. A system, comprising:
  one or more computer processors; and
  a memory containing computer program code that, when executed by operation of the one or more computer processors, performs an operation for analyzing text, the operation comprising:
    tokenizing a plurality of documents into a plurality of sets of terms;
    calculating an average top dimension weight corresponding to the plurality of documents based on performing singular value decomposition (SVD) factorization for a plurality of dimension counts;
    calculating an average inverse top dimension top term ranking for the plurality of documents based on the SVD factorization for the plurality of dimension counts;
    determining a number of dimensions based on the average top dimension weight and the average inverse top dimension top term ranking; and
    building a topic model for the plurality of documents based on the number of dimensions, wherein the topic model is adapted to identify patterns of terms that correspond to semantic topics in at least the plurality of documents.

16. The system of claim 15, wherein calculating the average top dimension weight corresponding to the plurality of documents further comprises:
for each of the plurality of documents:
determining a top dimension of a plurality of dimensions relating to the document; and
determining a top dimension weight that indicates how well the top dimension describes the document; and
calculating the average top dimension weight by averaging the determined top dimension weights for all of the plurality of documents.

17. The system of claim 16, wherein calculating the average inverse top dimension top term ranking for the plurality of documents further comprises:
for each of the plurality of documents:
for each of the terms in a set of terms corresponding to the document, determining a ranking of the term within a top dimension;
determining a highest ranking term for the document for the top dimension; and
calculating an inverse top dimension top term ranking for the document, based on a ranking of the highest ranking term for the document within the top dimension; and
calculating the average inverse top dimension top term ranking by averaging inverse top dimension top term rankings for the plurality of documents.

18. A non-transitory computer-readable medium containing computer program code that, when executed by operation of one or more computer processors, performs an operation for analyzing text, the operation comprising:
tokenizing a plurality of documents into a plurality of sets of terms;
calculating an average top dimension weight corresponding to the plurality of documents based on performing singular value decomposition (SVD) factorization for a plurality of dimension counts;
calculating an average inverse top dimension top term ranking for the plurality of documents based on the SVD factorization for the plurality of dimension counts;
determining a number of dimensions based on the average top dimension weight and the average inverse top dimension top term ranking; and
building a topic model for the plurality of documents based on the number of dimensions, wherein the topic model is adapted to identify patterns of terms that correspond to semantic topics in at least the plurality of documents.

19. The non-transitory computer-readable medium of claim 18, wherein calculating the average top dimension weight corresponding to the plurality of documents further comprises:
for each of the plurality of documents:
determining a top dimension of a plurality of dimensions relating to the document; and
determining a top dimension weight that indicates how well the top dimension describes the document; and
calculating the average top dimension weight by averaging the determined top dimension weights for all of the plurality of documents.

20. The non-transitory computer-readable medium of claim 19, wherein calculating the average inverse top dimension top term ranking for the plurality of documents further comprises:
for each of the plurality of documents:
for each of the terms in a set of terms corresponding to the document, determining a ranking of the term within a top dimension;
determining a highest ranking term for the document for the top dimension; and
calculating an inverse top dimension top term ranking for the document, based on a ranking of the highest ranking term for the document within the top dimension; and
calculating the average inverse top dimension top term ranking by averaging inverse top dimension top term rankings for the plurality of documents.

* * * * *